United States Patent [19]

Rice

[11] Patent Number: 4,804,162
[45] Date of Patent: Feb. 14, 1989

[54] ADJUSTABLE ENGINE SUPPORT

[75] Inventor: Joseph M. Rice, 115 E. Fairview St., Bethlehem, Pa. 18018

[73] Assignee: Joseph M. Rice, Bethlehem, Pa.

[21] Appl. No.: 67,550

[22] Filed: Jun. 29, 1987

[51] Int. Cl.$^4$ ............................................. F16M 1/00
[52] U.S. Cl. .................... 248/671; 248/129; 248/649
[58] Field of Search ............... 248/671, 676, 649, 124, 248/129, 188.5, 352, 670, 672, 122, 172, 549; 280/79.1 A, 35; 269/17, 69

[56] References Cited

U.S. PATENT DOCUMENTS

| 493,811 | 3/1893 | Beckert | 248/129 X |
|---|---|---|---|
| 968,315 | 8/1910 | Beckert | 280/79.1 A |
| 1,515,915 | 11/1924 | Valenta | 269/17 X |
| 1,600,835 | 9/1926 | Manley | 248/188.5 X |
| 2,455,047 | 11/1948 | Doyle | 248/124 |
| 2,885,165 | 5/1959 | Smolen | 248/124 X |
| 3,159,410 | 12/1964 | Raymond | 280/35 |
| 3,306,601 | 2/1967 | Mitchell | 248/124 X |
| 4,177,978 | 12/1979 | Warsaw | 269/17 |

FOREIGN PATENT DOCUMENTS 877851 9/1961 United Kingdom .................. 280/35

Primary Examiner—Ramon S. Britts
Assistant Examiner—Karen J. Chotkowski
Attorney, Agent, or Firm—Steele, Gould & Fried

[57] ABSTRACT

An engine support for, in particular, front wheel drive vehicles is disclosed. An adjustable base is fitted with legs which adjust to varying heights. The legs include on their tops, rotatable cradles sized to receive an engine mount. The engine support is wheeled underneath an elevated vehicle and an engine and its mount are lowered onto the cradles. The engine is then wheeled away from the vehicle.

13 Claims, 2 Drawing Sheets

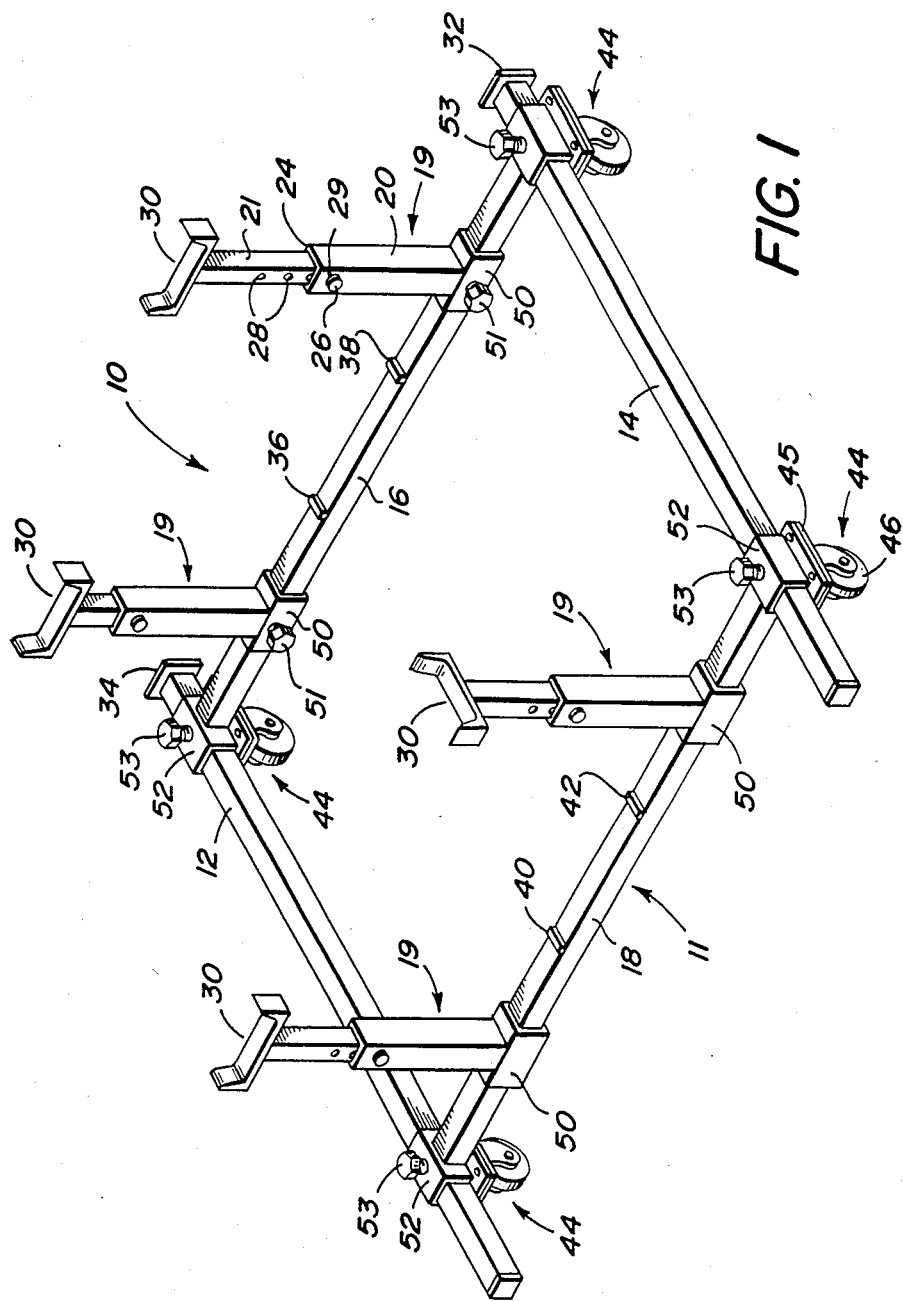

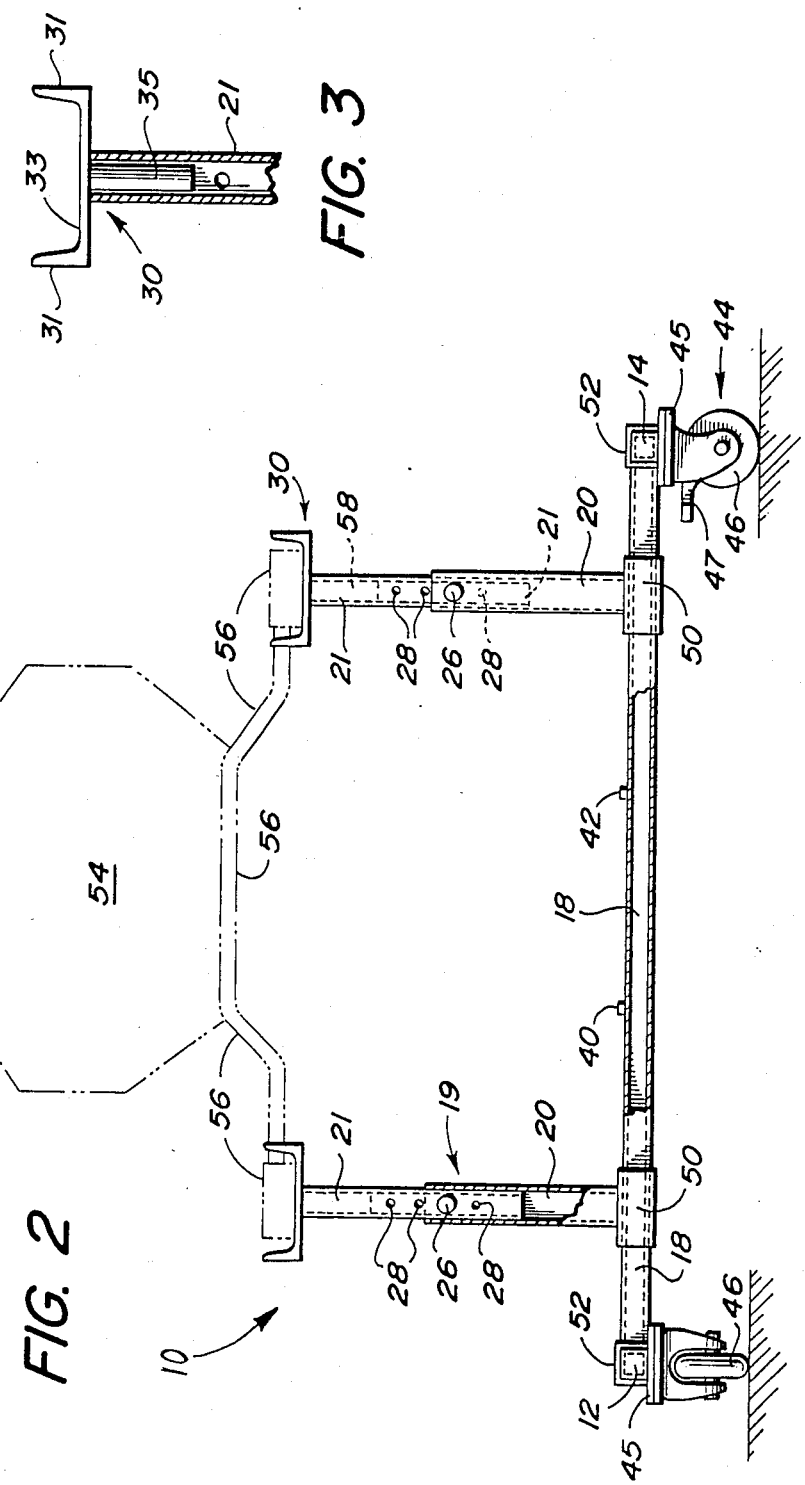

ADJUSTABLE ENGINE SUPPORT

BACKGROUND OF THE INVENTION

1. Field of the Invention

This invention relates to machinery supports and, more particularly, to a support for the engine of a front wheel drive vehicle.

2. Description of the Prior Art

It is often necessary to remove the entire engine and its mount from a vehicle in order to do repairs on the engine or to repair the vehicle body. When this is necessary, it is common to manually lift the engine from the vehicle and set the engine on the floor or on a workbench. This chore is very difficult and requires great strength. Presently, there are believed to be supports available and workbenches which each accommodate a particular engine from particular vehicles, but there are no known engine supports which may be wheeled, for example, under a front wheel vehicle of any make when the vehicle is elevated.

There is, therefore, a need for a support to receive any front wheel drive engine in an above the ground and open manner so that persons can work on the engine while it is on the support. There is also a need for a wheeled, adjustable engine support which accepts any front wheel drive engine and mount, and is readily moved to a storage or work area.

SUMMARY OF THE INVENTION

The aforementioned prior art problems are obviated by the apparatus of this invention which is an adjustable engine support for engines particularly of front wheel drive vehicles. The support, in the preferred embodiment, has a generally rectangular base with two parallel end bars and two parallel side bars slidably mounted on the end bars. The side bars are moved along the end bars until they attain the desired width of the support. To each side bar are slidably attached vertical support legs. Each leg is composed, preferably, of telescoping tubes which may be secured at varying heights. A cradle sits on the top of each leg and the vehicle engine mount is placed upon the cradles. Preferably, the base side and end bars and the legs are tubular, and the attachments of bar to bar and leg to bar are made with slidable tubular brackets.

It is, therefore, an object of this invention to provide a portable and adjustable engine support which is easily moved into position underneath a vehicle and receives engines with mounts of different sizes.

It is another object of this invention to provide an engine support which is both inexpensive to manufacture and simple to assemble.

It is another object of this invention to provide an engine support which disassemble for compact storage.

It is a further object of this invention to provide an engine support which holds the engine on its mount above the ground for accessibility during repairs.

It is still a further object of this invention to provide an adjustable engine support which employs stops to prevent tipping of the engine.

It is another object of this invention to provide an adjustable engine support with support cradles which rotate to accomodate any angle or position of engine mount.

These and other objects will be more readily ascertainable to one skilled in the art from a consideration of the following Figures, description and exemplary embodiments.

BRIEF DESCRIPTION OF THE DRAWING(S)

FIG. 1 shows the preferred embodiment of the engine support of this invention, the legs shown at varying heights for illustrative purposes.

FIG. 2 is a side view of the apparatus of FIG. 1 showing an engine and its mount in phantom on the cradles.

FIG. 3 is an enlarged partial cross section of a cradle to illustrate the mounting of the cradle in the support leg.

DETAILED DESCRIPTION OF THE PREFERRED EMBODIMENT(S)

Referring now to the drawings, and more particularly to FIG. 1, engine support 10 is shown with base 11 assembled with side bars 16 and 18 mounted on end bars 12 and 14 and legs 19 attached to base 11 on side bars 16 and 18. Engine support 10 adjusts in several ways to accommodate engine mounts of different sizes. Although base 11 is shown with side bars 16 and 18 mounted on end bars 12 and 14, the reverse is also possible, end bars 12 and 14 mounted by brackets on side bars 16 and 18.

First, base 11 adjusts in width by sliding tubular brackets 52 along end bars 12 and 14 to allow side bars 16 anad 18 to form rectangles of varying widths with end bars 12 and 14. Side bars 16 and 18 are preferably attached to sliding tubular brackets 52 by welding. Once the desired width is determined, bolts 53 are tightened through brackets 52 against end bars 12 and 14 to secure side bars 16 and 18 in position.

Next, legs 19 slide along side bars 16 and 18 to adjust for engine mounts of different lengths. Legs 19 are attached, preferably by welding, to sliding tubular brackets 50. When the desired position has been determined, legs 19 are secured in position by tightening bolts 51 through brackets 50 against side bars 16 and 18.

Each leg 19 is adjustable for varying heights by a telescoping arrangement of inner and outer legs. For purposes of illustration, only one leg 19 will be discussed. Leg 19 has outer leg 20 and inner leg 21. Inner leg 21 has a plurality of apertures 28. Outer leg 20 has one aperture 29 through which pin 26 has been inserted. When a desired height has been determined, according to the mechanic's preference, an aperture 28 is aligned with aperture 29 and pin 26 is inserted through both apertures. It is probable that all four legs 19 will be fixed at the same height, although, for purposes of illustration, legs 19 have been shown at different heights. Cradles 30 are mounted by a pin inside inner leg 21 Legs 19 are independently movable along members of base 11 and are vertically adjustable by the raising and lowering of inner legs 21 which may also be considered vertically adjustable brackets on which cradles 30 are mounted. to rest on the top of inner leg 21. Cradles 30 are also adjustable, as will be illustrated in FIG. 3.

Engine support 10 is not only versatile by its adjustability, it offers the advantage of being capable of being rolled into position underneath a vehicle. Wheel assemblies 44 include wheel 46 and mounting plate 45 which is attached to side bar brackets 52. Without engine support 10, a mechanic needs to lift an engine from the car by hand or by a hoist, and transport it to another place for storage or repairs. With engine support 10, support 10 is wheeled into position underneath a vehicle and the engine is lowered only a minimal distance to rest on cradles 30. Wheels 46 then allow the entire engine and engine support to be rolled away from the vehicle. Wheel assemblies 44 are further described in reference to FIG. 2.

Engine support 10 includes safety features. First, end stops 32 and 34 prevent side bars 16 and 18 from slipping off end bars 12 and 14. Stops 36, 38, 40, and 42, which are intermediate stops on side bars 16 and 18, prevent legs 19 from each other too closely, allowing an engine supported on legs 19 to possibly tip. In use, the weight of the engine should be distributed as widely as possible accross support 10.

Another advantage of engine support 10 is that is disassembles into easily stored pieces. Each cradle 30 is removable from inner leg 21. Each leg 19 may be readily dismounted completely from side bars 16 and 18, and side bars 16 and 18 may be removed from end bars 12 and 14. In a garage equipped with many pieces of equipment, simple disassembly and compact storage are valuable attributes.

Bars 12, 14, 16, and 18, and legs 19 have been illustrated as tubes which are hollow and square in cross section, although they could be solid. Although, for economy of manufacture, hollow and square tubing is preferable, circular tubing is equally satisfactory in performance. While the legs 19 could be raised by scissors (criss/cross) or other jointing, telescoping tubes are satisfactory and more economical.

Now referring to FIG. 2, engine 54 on engine mount 56 is shown resting in cradles 30 of engine support 10. Engine support 10 has tubular side bar 18 mounted on tubular end bars 12 and 14 through tubular sliding brackets 52. Wheel assemblies 44 with wheels 46 are seen mounted by mounting plate 45 on the underneath of brackets 52. Held to side bars 16 and 18 by tubular brackets 50 are legs 19. Legs 19 have inner legs 21 and outer legs 22 and are adjusted by inserting pin 26 though aperture 29 and pre-selected apertures 28. Cradles 30 are seen to be sized to receive the width of engine mount 56. Stops 40 and 42 are seen on side bar 18 to prevent improper positioning of legs 19.

In use, a mechanic rolls engine support 10 underneath a vehicle which has been raised on a lift. Engine support 10 is adjusted to mirror the dimensions of the engine mount 56. Engine 54 and mount 56 are lowered onto cradles 30. The vehicle is then raised until engine 54 and support 10 can be freely wheeled from under the vehicle. If repairs to the engine aree necessary, they can be made while the engine is on support 10.

Also seen in FIG. 2 are wheel assemblies 44 which utilize wheel 46 which is rotatably held in plate 45. Wheel assemblies 44 are conventional. Bearings in plate 45 (not shown), give the wheels 360° rotation. Wheel assembly 44 is preferably fitted with a pedal brake/lock 47, such as is common on carriages and the like. Brake/lock 47 prevents movement of wheels 46 at the critical time of engine loading as well as when the engine is being repaired.

Now referring to FIG. 3, cradle 30 is seen rotatably mounted in inner leg 21. Pin 35, attached to the bottom of cradle 30, is circular in cross section and is smaller in diameter than the interior diameter of inner leg 21. This sizing allows pin 35 to rotate freely in inner leg 21 so that cradle 30 may be positioned to accommodate for the slightly different configurations of engine mounts 56.

Cradle 30 is generally U-shaped with flat cross piece 33 and two short arms 31. Cross piece 33 is of a length to receive the width of the standard engine mount 56. Arms 31 are of sufficient height to prevent engine mount 56 from sliding off cross piece 33. Other cradle shapes are possible, but the cradle as illustrated best accomodates the width and height of the standard engine mount.

Also, cradles 30 are able to rock slightly in inner legs 21 to allow for slight differences in the shapes and angles of attachment of the different engine mounts.

There are several variations which can be practiced in the scope of this invention. First, side bars, end bars, and legs may be constructed of tubing which is either circular or square in cross section, or partially or totally solid. Side and end bars may be fixed in dimension, but adjustable is preferred as more versatile. The base and support legs are preferably constructed of steel, preferably of 3/16" or 1/8" gauge. The engine support constructed as described above is intended to support a weight of about 500 pounds, which is an average engine weight today.

Although bolts have been illustrated as the securing means for holding brackets 50 and 52 in their desired positions, other fastening or locking means, such as a lever activated press fit, are equally acceptable and within the scope of this invention.

Telescoping means are not essential for the legs and other means of elevating, such as scissor brackets could be used. Four support legs are preferred as likely to provide adequate support, but less or more could be employed. Likewise, cross bracing to increase rigidity is within the scope of this invention.

The size and shape of the cradles and their method of mounting in the base is optional and within the skill of the art to select the most suitable for various applications.

The base members may be attached to each other by mounting side bars on end bars or end bars on side bars.

Wheels are shown and are useful, but optional.

There are many advantages to the engine support of this invention. Chiefly, it is completely adjustable to support the engine of almost any vehicle, particularly the engines of front wheel drive vehicles.

Second, it holds the engine in a workable position above the ground.

Third, it wheels into position and relieves the mechanic of carrying the engine by hand.

Having now illustrated and described my invention, it is not intended that such description limit this invention, but rather that this invention be limited only by reasonable interpretation of the appended claims.

What is claimed is:

1. An adjustable, portable engine support for engines of front wheel drive vehicles and the like, comprising:
   (a) a generally rectangular base including two generally parallel end bars and two generally parallel side bars;
   (b) at least three support legs, each leg having sliding means for mounting one end of said leg to one of said side bars and extending generally upwardly;
   (c) vertically adjustable and independently movable bracket mounted on each of said support legs; and,
   (d) an engine support cradle freely rotatably mounted on each of said vertically adjustable brackets,
   whereby said engine support may be multiply configured by independently positioning said engine support cradles both horizontally and vertically to accomodate a plurality of vehicles and engines.

2. The engine support according to claim 1, wherein said side bars and said end bars are attached by a second sliding means to enablee expansion and contraction of said base.

3. The engine support according to claim 1, further comprising wheels attached to said base.

4. The engine support according to claim 3, wherein said wheels include locking means.

5. The engine support according to claim 2, further comprising locking means for limiting expansion and contraction of said base.

6. The engine support according to claim 2, further comprising at least two intermediate stops on said side bars spaced apart and proximate a mid-point of said side bar for limiting contraction of said base.

7. The engine support according to claim 1, wherein said base members are tubes, said tubes being square in cross section.

8. The engine support according to claim 1, wherein each said support leg comprises one of two telescoping tubes and each said bracket comprises the other of said two telescoping tubes, and further comprising locking means for fixing said telescoping tubes in relation to one another.

9. The engine support according to claim 8, wherein each said cradle comprises a U-shaped bracket including a pin perpendicularly attached to the underside of said U-shaped bracket, said pin sized to be vertically and rotatably received in any one of said vertically adjustable leg brackets.

10. An adjustable, portable wheeled engine support especially for engines of front wheel drive vehicles and the like, comprising:
(a) a generally rectangular base including two generally parallel end bars and two generally parallel side bars, each said side bar comprises a sliding means mounted on said end bars for increasing and decreasing the base insize, each said side bar including
two intermediate stops spaced apart and proximate a midpoint of said side bar for limiting contraction of said base;
(b) four vertically adjustable and independently movable support legs, each said leg being slidably mounted at one end on said base and extending generally upwardly therefrom, each of said legs comprising:
 (i) two telescoping tubes, an interior tube and an exterior tube;
 (ii) locking means for fixing said tubes in relation to one another; and,
(c) an engine support cradle freely rotatably mountable on each of said legs, each cradle being generally U-shaped and including a pin mounted perpendicularly on the underside of said cradle for rotatable mounting in said tubular leg,
whereby said engine support may be multiply configured by independently positioning said cradles both horizontally and vertically to accomodate a plurality of vehicles and engines.

11. The engine support according to claim 10, further comprising means for locking said wheels.

12. The engine support according to claim 10, further comprising locking means for limiting expansion and contraction of said base.

13. The engine support according to claim 1, wherein said vertically adjustable brackets are members having substantially tubular cross sections being dimensioned relative to the diameter of said pin on said cradle to enable said cradle to rock slightly out of vertical relative to said support leg to further accomodate various engine configurations.

* * * * *